United States Patent
Buchanan et al.

(10) Patent No.: US 10,140,975 B2
(45) Date of Patent: Nov. 27, 2018

(54) SPEECH ENDPOINTING BASED ON WORD COMPARISONS

(71) Applicant: Google LLC, Mountain View, CA (US)

(72) Inventors: Michael Buchanan, London (GB); Pravir Kumar Gupta, Los Altos, CA (US); Christopher Bo Tandiono, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/156,478

(22) Filed: May 17, 2016

(65) Prior Publication Data

US 2016/0260427 A1 Sep. 8, 2016

Related U.S. Application Data

(63) Continuation of application No. 14/681,203, filed on Apr. 8, 2015.
(Continued)

(51) Int. Cl.
*G10L 17/00* (2013.01)
*G10L 15/05* (2013.01)
(Continued)

(52) U.S. Cl.
CPC .............. *G10L 15/05* (2013.01); *G10L 15/04* (2013.01); *G10L 15/22* (2013.01); *G10L 15/26* (2013.01);
(Continued)

(58) Field of Classification Search
None
See application file for complete search history.

(56) References Cited

U.S. PATENT DOCUMENTS

| 4,713,777 A | 12/1987 | Klovstad |
| 4,980,918 A | 12/1990 | Bahl |

(Continued)

FOREIGN PATENT DOCUMENTS

WO  2001086633  11/2001

OTHER PUBLICATIONS

Extended European Search Report issued in European Application No. 15164091.9 dated Sep. 2, 2015, 9 pages.
(Continued)

*Primary Examiner* — Richard Zhu
(74) *Attorney, Agent, or Firm* — Fish & Richardson P.C.

(57) ABSTRACT

Methods, systems, and apparatus, including computer programs encoded on a computer storage medium, for speech endpointing based on word comparisons are described. In one aspect, a method includes the actions of obtaining a transcription of an utterance. The actions further include determining, as a first value, a quantity of text samples in a collection of text samples that (i) include terms that match the transcription, and (ii) do not include any additional terms. The actions further include determining, as a second value, a quantity of text samples in the collection of text samples that (i) include terms that match the transcription, and (ii) include one or more additional terms. The actions further include classifying the utterance as a likely incomplete utterance or not a likely incomplete utterance based at least on comparing the first value and the second value.

23 Claims, 4 Drawing Sheets

Related U.S. Application Data

(60) Provisional application No. 61/983,025, filed on Apr. 23, 2014.

(51) Int. Cl.

| | | |
|---|---|---|
| *G10L 17/06* | (2013.01) | |
| *G10L 15/04* | (2013.01) | |
| *G10L 15/22* | (2006.01) | |
| *G10L 15/26* | (2006.01) | |
| *G10L 25/87* | (2013.01) | |
| *G10L 25/51* | (2013.01) | |
| G10L 25/78 | (2013.01) | |
| G10L 25/90 | (2013.01) | |

(52) U.S. Cl.
CPC ............. *G10L 17/06* (2013.01); *G10L 25/51* (2013.01); *G10L 25/87* (2013.01); *G10L 25/78* (2013.01); *G10L 25/90* (2013.01)

(56) References Cited

U.S. PATENT DOCUMENTS

| | | | |
|---|---|---|---|
| 5,479,563 A | 12/1995 | Yamaguchi | |
| 5,940,794 A | 8/1999 | Abe | |
| 6,018,708 A | 1/2000 | Dahan | |
| 6,029,130 A | 2/2000 | Ariyoshi | |
| 6,321,197 B1 | 11/2001 | Kushner | |
| 6,324,509 B1 | 11/2001 | Bi | |
| 6,453,292 B2 | 9/2002 | Ramaswamy | |
| 6,810,375 B1 | 10/2004 | Ejerhed | |
| 7,035,807 B1 | 4/2006 | Brittain et al. | |
| 7,136,806 B2 | 11/2006 | Miyahira | |
| 7,177,810 B2 | 2/2007 | Shriberg | |
| 7,610,199 B2 | 10/2009 | Abrash | |
| 8,099,280 B2 | 1/2012 | Kuboyama | |
| 8,165,880 B2 | 4/2012 | Hetherington | |
| 8,170,875 B2 | 5/2012 | Hetherington | |
| 8,175,876 B2 | 5/2012 | Bou-Ghazale | |
| 8,494,857 B2 | 7/2013 | Pakhomov | |
| 8,554,564 B2 | 10/2013 | Hetherington | |
| 8,719,015 B2 | 5/2014 | Jang | |
| 8,762,150 B2 | 6/2014 | Edgington | |
| 8,843,369 B1* | 9/2014 | Sharifi | G10L 25/87 704/235 |
| 9,311,932 B2 | 4/2016 | Carter | |
| 9,437,186 B1 | 9/2016 | Liu et al. | |
| 2001/0034601 A1 | 10/2001 | Chujo et al. | |
| 2001/0056344 A1 | 12/2001 | Ramaswamy et al. | |
| 2002/0042709 A1* | 4/2002 | Klisch | G10L 15/04 704/231 |
| 2005/0038652 A1* | 2/2005 | Dobler | G10L 15/22 704/251 |
| 2005/0108011 A1 | 5/2005 | Keough et al. | |
| 2006/0241948 A1* | 10/2006 | Abrash | G10L 25/87 704/275 |
| 2006/0287859 A1* | 12/2006 | Hetherington | G10L 25/87 704/260 |
| 2007/0143110 A1* | 6/2007 | Acero | G10L 15/05 704/251 |
| 2007/0201639 A1 | 8/2007 | Park | |
| 2008/0294433 A1 | 11/2008 | Yeung | |
| 2009/0063150 A1 | 3/2009 | Nasukawa et al. | |
| 2009/0076817 A1 | 3/2009 | Jeon | |
| 2009/0149166 A1 | 6/2009 | Habib et al. | |
| 2010/0017209 A1 | 1/2010 | Yu et al. | |
| 2010/0076761 A1 | 3/2010 | Juergen et al. | |
| 2010/0133279 A1 | 5/2010 | Pilz | |
| 2010/0280827 A1 | 11/2010 | Mukerjee et al. | |
| 2010/0292989 A1 | 11/2010 | Kitade et al. | |
| 2011/0153309 A1 | 6/2011 | Kim et al. | |
| 2011/0264447 A1 | 10/2011 | Visser et al. | |
| 2014/0012573 A1* | 1/2014 | Hung | G06F 1/3215 704/233 |
| 2014/0156268 A1* | 6/2014 | Arizmendi | G10L 15/1822 704/231 |
| 2015/0310879 A1 | 10/2015 | Buchanan et al. | |

OTHER PUBLICATIONS

Ferrer et al., "A Prosody-Based Approach to End-of-Utterance Detection that does not require Speech Recognition," IEEE International Conference on Acoustics, Speech, and Signal Processing, 2003, 1:I-608-I-611.

Ferrer et al., "Is the Speaker done yet? Faster and more accurate End-of-Utterance detection using Prosody," INTERSPEECH, ISCA, (2002), 2061-2064.

Gotoh et al., "Sentence Boundary Detection in Broadcast Speech Transcripts," in Proc. of ISCA Workshop: Automatic Speech Recognition: Challenges for the new Millennium ASR-2000, Sep. 2000, 8 pages.

Liu et al., "Comparing and Combining Generative and Posterior Probability Models: Some Advances in Sentence Boundary Detection in Speech," Proc. EMNLP, 2004, Jan. 2004, 8 pages.

Extended European Search Report issued in European Application No. 17152524.9, dated Jun. 1, 2017, 7 pages.

Gravano et al. "Turn-taking cues in task-oriented dialogue," Computer and Language , Elseview, London, GB, 25(3), Jul. 2011, 34 pages.

Raux et al. "Optimizing endpointing thresholds using dialogue features in a spoken dialogue system," Proceedings of the 9$^{th}$ SIGDIAL Workshop on Discourse and Dialogue, Jan. 1, 2008, 10 pages.

Yoshida. "Automatic utterance segmentation in spontaneous speech, Master thesis," Massachusetts institute of technology, Sep. 22, 2002, 80 pages.

\* cited by examiner

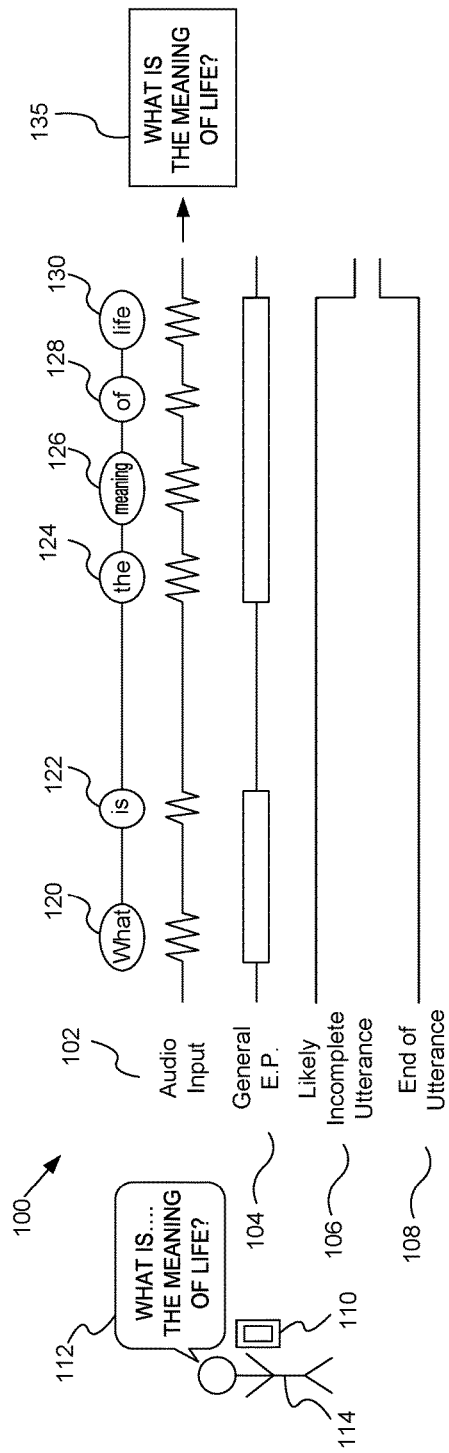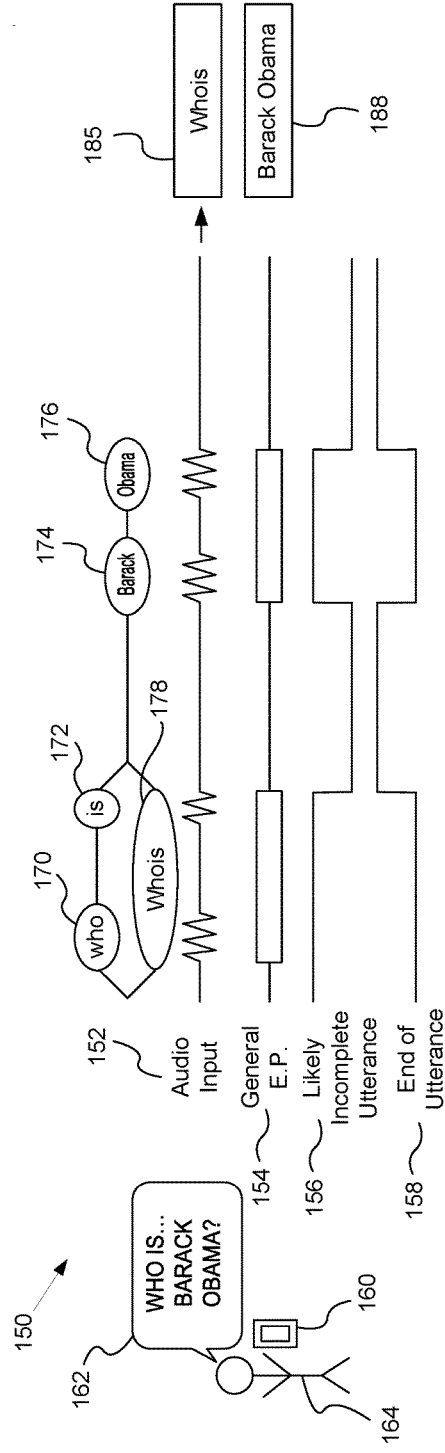

SPEECH ENDPOINTING BASED ON WORD COMPARISONS

CROSS REFERENCE TO RELATED APPLICATIONS

This application is a continuation of U.S. application Ser. No. 14/681,203, filed Apr. 8, 2015, which claims the benefit of U.S. Patent Application No. 61/983,025, filed Apr. 23, 2014, the contents of which are incorporated by reference.

TECHNICAL FIELD

This disclosure generally relates to speech recognition, and one particular implementation relates to endpointing speech.

BACKGROUND

Natural language processing systems typically use endpointers to determine when a user has started and finished speaking. Some traditional endpointers evaluate the duration of pauses between words in determining when an utterance begins or ends. For instance, if a user says "what is <long pause> for dinner," a traditional endpointer may segment the voice input at the long pause, and may instruct the natural language processing system to attempt to process the incomplete phrase "what is," instead of the complete phrase "what is for dinner." If an endpointer designates an incorrect beginning or ending point for a voice input, the result of processing the voice input using the natural language processing system may be inaccurate or undesirable.

SUMMARY

According to an innovative aspect of the subject matter described in this specification, a computing device may receive an audio input of an utterance spoken by a user, and may use a continuous speech recognizer to incrementally transcribe the utterance. The computing device compares the incrementally recognized transcription to text samples from a collection of text samples, such as a collection of search queries that were previously submitted to a search engine by other users, to determine whether the transcription more likely represents a complete query or an incomplete query.

According to one approach, determining whether the transcription more likely represents a complete query or an incomplete query includes determining a quantity of the text samples that match the transcription and that do not include any additional terms, and determining a quantity of text samples that match with the transcription and that do include one or more additional terms. The computing device may then determine a ratio based on those two quantities and compares the determined ratio to a threshold ratio. If the determined ratio does not satisfy the threshold ratio, then the computing device classifies the utterance as likely an incomplete utterance. If the determined ratio satisfies the threshold ratio, then the computing device classifies the utterance as not likely an incomplete utterance.

The device may endpoint the voice input, or may deactivate the microphone or maintain the microphone in an active state based on the classification of the utterance as likely a complete utterance or an incomplete utterance. If the utterance is classified as likely an incomplete utterance, then the device can maintain the microphone in an active state to receive an additional utterance, or may wait further before endpointing the voice input. If the utterance is classified as not likely an incomplete utterance, then the device can deactivate the microphone and process the utterance, or may not wait further before endpointing the voice input.

In general, another innovative aspect of the subject matter described in this specification may be embodied in methods that include the actions of obtaining a transcription of an utterance; determining, as a first value, a quantity of text samples in a collection of text samples that (i) include terms that match the transcription, and (ii) do not include any additional terms; determining, as a second value, a quantity of text samples in the collection of text samples that (i) include terms that match the transcription, and (ii) include one or more additional terms; and classifying the utterance as a likely incomplete utterance or not a likely incomplete utterance based at least on comparing the first value and the second value.

These and other embodiments can each optionally include one or more of the following features. The actions of determining, as a first value, a quantity of text samples in a collection of text samples that (i) include terms that match the transcription, and (ii) do not include any additional terms includes determining that, in each text sample, that terms that match the transcription occur in a same order as in the transcription. The action of determining, as a second value, a quantity of text samples in the collection of text samples that (i) include terms that match the transcription, and (ii) include one or more additional terms includes determining that, in each text sample, the terms that match the transcription occur at a prefix of each text sample.

The action of classifying the utterance as a likely incomplete utterance or not a likely incomplete utterance based at least on comparing the first value and the second value includes determining a ratio of the first value to the second value; determining that the ratio satisfies a threshold ratio; and based on determining that the ratio satisfies the threshold ratio, classifying the utterance as a likely incomplete utterance. The action of classifying the utterance as a likely incomplete utterance or not a likely incomplete utterance based at least on comparing the first value and the second value includes classifying the utterance as a likely incomplete utterance; and based on classifying the utterance as a likely incomplete utterance, maintaining a microphone in an active state to receive an additional utterance.

The action of classifying the utterance as a likely incomplete utterance or not a likely incomplete utterance based at least on comparing the first value and the second value includes classifying the utterance as not a likely incomplete utterance; and based on classifying the utterance as not a likely incomplete utterance, deactivating a microphone. The actions further include receiving data indicating that the utterance is complete; where classifying the utterance as a likely incomplete utterance or not a likely incomplete utterance based at least on comparing the first value and the second value includes classifying the utterance as a likely incomplete utterance; and based on classifying the utterance as a likely incomplete utterance, overriding the data indicating that the utterance is complete.

Other embodiments of this aspect include corresponding systems, apparatus, and computer programs recorded on computer storage devices, each configured to perform the operations of the methods.

In general, another innovative aspect of the subject matter described in this specification may be embodied in methods that include the actions of obtaining a transcription of an utterance; determining whether, in a collection of text samples, the utterance more often matches (i) text samples that include terms that match the transcription and that do not include any additional terms than the utterance matches, or (ii) text samples that include terms that match the transcription and that do include one or more additional terms than the utterance matches; and determining whether the utterance is likely incomplete based on the determination.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. A user may use the voice input capabilities of a computing device and speak at a pace that is comfortable for the user. An utterance may be endpointed at the intended end of the utterance, leading to more accurate or desirable natural language processing outputs, and to faster processing by the natural language processing system. In the presence of background noise, an utterance may be endpointed at the intended end of the utterance.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A to 1C are diagrams of utterances and example signals used in classifying whether the utterances are likely incomplete.

Like reference numbers and designations in the various drawings indicate like elements.

DETAILED DESCRIPTION

Figure 1C:
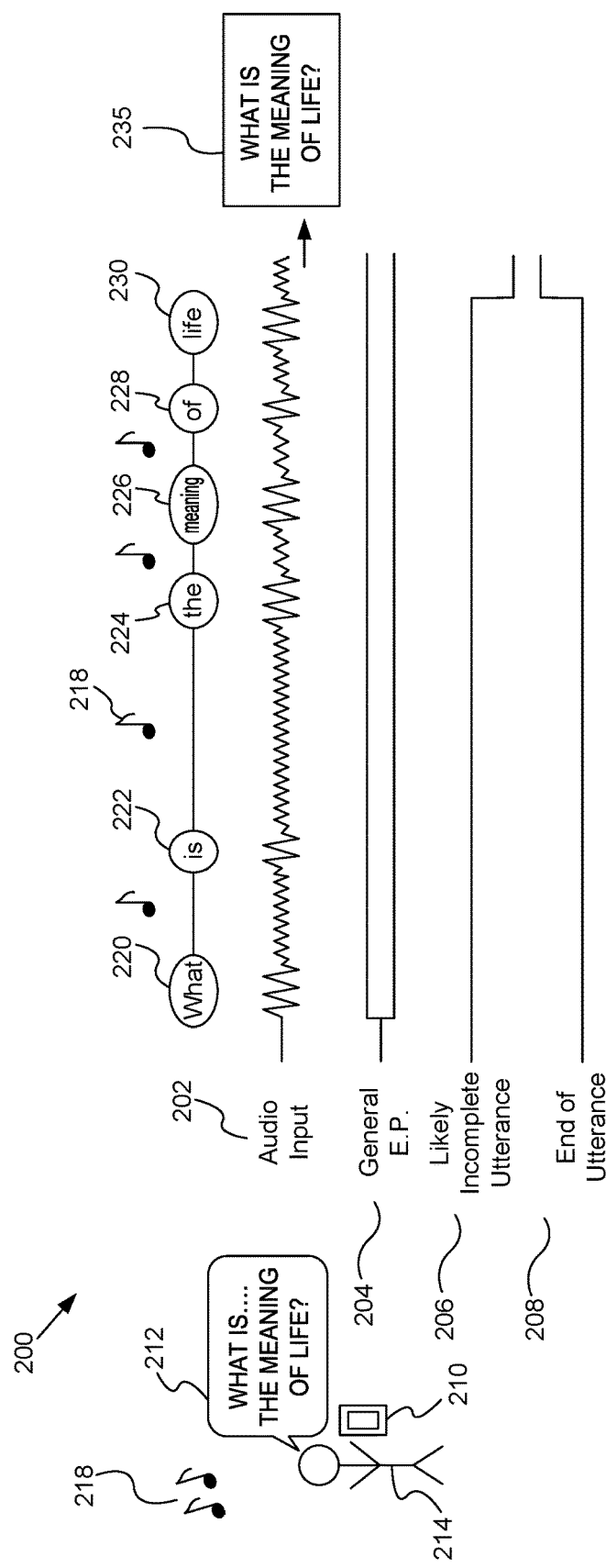

FIG. 1A is a diagram 100 of an utterance and example signals used in classifying whether the utterance is likely incomplete. In general, diagram 100 illustrates signals 102-108 that are generated or detected by computing device 110 when the computing device 110 is processing an incoming audio input 102. The computing device 110 receives the audio input 102 through a microphone or other audio input device of the computing device, and classifies whether the audio input 102 is an utterance that is likely incomplete or not likely incomplete.

The computing device 110 receives the audio input 102 and samples the audio input 102 at a pre-designated frequency and resolution. For example, the computing device 110 may sample the audio input 102 at 8 kHz, 16 kHz, 44.1 kHz, or any other sample rate, and the resolution may be 16 bits, 32 bits, or any other resolution. Audio input 102 illustrates sampled analog data that is based on an utterance 112 from user 114. In the example illustrated in FIG. 1A, user 114 says to the computing device 110, "What is . . . the meaning of life?" The computing device 110 may record and store the audio input 102 corresponding to the utterance 112.

The computing device 110 transcribes the utterance 112 spoken by the user 114. In some implementations, the computing device 110 transcribes the words of the utterance 112 using a processor of the computing device 110 that is running automated speech recognition (ASR) software. For example, the computing device 110 may determine locally on the computing device 110 that an initial portion audio input 102 contains the term 120 "what." The ASR software receives the audio input 102 as the computing device 110 receives the utterance 112 from the user. As the ASR software recognizes a term in the audio input 102, then the ASR software will provide that term for output to the computing device 110. The computing device 110 records the amount of time between the ASR software returning terms that the ASR software recognizes. For example, the ASR software may return the term 120 "what," then one hundred millisecond later return the term 122 "is," and then two hundred milliseconds later return the term 124 "the." The computing device 110 records that term 122 "is" follows term 120 "what" after one hundred milliseconds and term 124 "the" follows term 122 "is" after two hundred milliseconds. In some implementations, a server accessible through a network may be running the ASR software. In this case, the computing device transmits the audio input 102 to the server over the network, receives terms from the server, and records the amount of time between the server returning terms.

As the computing device 110 is transcribing the terms 120-130 of the utterance 112, the computing device 110 receives a general endpointer signal 104 from a general endpointer. The computing device 110 provides the general endpointer with the terms received from the ASR software and the recorded times between each term. The general endpointer compares the recorded times to a threshold. If one of recorded times between two terms satisfies a threshold, then the general endpointer identifies an endpoint to be between the two terms. For example, the threshold may be one hundred fifty milliseconds. The general endpointer compares the time of one hundred milliseconds between term 120 "what" and term 122 "is." Because one hundred milliseconds is less than the threshold of one hundred fifty milliseconds, the general endpointer does not add an endpoint between term 120 "what" and term 122 "is." The general endpointer also compares the time of two hundred milliseconds between term 122 "is" and term 124 "the." Because two hundred milliseconds is greater than the threshold of one hundred fifty milliseconds, the general endpointer adds an endpoint between term 122 "is" and term 124 "the." The general endpointer signal 104 illustrates the endpoints as transitions between an active signal and an inactive signal. The general endpointer signal is active between term 120 "what" and term 122 "is" and becomes inactive between term 122 "is" and term 124 "the."

In some implementations, the general endpointer waits for a particular period of time after the end of a term before the general endpointer identifies an endpoint. The general endpointer waits after each term is received from the ASR software or after the general endpointer received an indication that the ASR identified a term. If the waiting time satisfies a threshold, then the general endpointer identifies an endpoint. For example, the threshold may be one hundred fifty milliseconds. If the general endpointer receives an indication that the ASR software has identified a term, such as term 120 "what," then the general endpointer will begin a timer. One hundred milliseconds later, the general endpointer receives an indication that the ASR software has identified another term, such as term 122 "is." Because the timer of the general endpointer did not reach the threshold of one hundred fifty milliseconds, the general endpointer did not identify an endpoint after term 120 "what." As another example, the general endpointer receives an indication that the ASR software has identified a term, such as term 122 "is"

and the general endpointer begins a timer. If one hundred fifty millisecond later, the general endpointer has not received an indication of a subsequent term, then the general endpointer identifies an endpoint after the term 122 "is."

The computing device 110 classifies, using the terms that the ASR software identifies from the audio input 102, the terms as a likely incomplete utterance or not a likely incomplete utterance. The likely incomplete utterance signal 106 illustrates the result of this classification. To classify the identified terms of the utterance 112 as a likely incomplete utterance, the computing device 110 compares the identified terms to text samples in a collection of text samples. The computing device 110 determines the quantity of text samples in the collection of text samples that begin with the identified terms of the utterance 112 and contain additional terms. In other words, the computing device 110 determines the quantity of text samples in the collection of text samples that contain a prefix that matches the identified terms of the utterance 112. For example, the ASR software identifies the first two terms of utterance 112 as "what is." The computing device 110 determines that of the collection of text samples, two thousand text samples begin with the prefix "what is" and contain additional terms. The computing device 110 also identifies the quantity of text samples in the collection of text samples that match the identified terms of the utterance 112 and do not contain any additional terms. For example, the computing device 110 determines that of the collection of text samples, five contain the terms "what is" and no additional terms.

With the quantity of text samples in the collection of text samples that begin with the identified terms of the utterance 112 and the quantity of text samples that contain the identified terms of the utterance 112, the computing device 110 compares a ratio of the two quantities to a threshold ratio. The ratio represents a comparison of the quantity of text samples that contain the identified terms and no other terms and the quantity of text samples that begin with the identified and contain additional terms. If the ratio is less than the threshold ratio, then the computing device 110 classifies the identified terms as representing a likely incomplete utterance. If the ratio is more than the threshold ratio, then the computing device 110 classifies the identified terms as not representing a likely incomplete utterance. For example, if the ratio is 5:2000 and the threshold ratio is 1:200, then the computing device 110 would classify the identified terms as representing a likely incomplete utterance.

In some implementations, the computing device 110 may invalidate the comparison in instances where one or both of the quantities does not satisfy a threshold. For example, if the ratio of the quantity of text samples that contain the identified terms and no other terms and the quantity of text samples that begin with the identified and contain additional terms is 1:2, then the computing device 110 may invalidate the comparison based on the quantity of text samples that begin with the identified and contain additional terms being below a threshold of five. As another example, if the ratio of the quantity of text samples that contain the identified terms and no other terms and the quantity of text samples that begin with the identified and contain additional terms is 11,000:12,000, then then the computing device 110 may invalidate the comparison based on the quantity of text samples that contain the identified terms and no other terms or the quantity of text samples that begin with the identified and contain additional terms or both as being above a threshold of ten thousand as may be the case with a term such as "so."

In some implementations, the computing device 110 does not compare the identified terms to the collection of text samples unless the general endpointer indicates that there is an endpoint between two terms. For example, the computing device 110 may not compare the term 120 "what" to the collection of text samples because the general endpointer signal 104 is active after the term 120 "what." As another example, the computing device may compare the terms 120-122 "what is" to the collection of text samples because the general endpointer signal is inactive after term 122.

In some implementations, the computing device 110 does not compare the identified terms to the collection of text samples unless the pause between terms satisfies a threshold. For example, the computing device 110 may compare the identified terms if the pause between terms is greater than one hundred fifty milliseconds. If the user 114 pauses one hundred milliseconds between term 120, "what," and term 122, "is," then the computing device 100 would not compare term 120, "what," to the collection of text samples. If the user 114 pauses two hundred milliseconds between term 122, "is," and term 124, "the," then the computing device compares "what is" to the collection of text samples.

Based on the comparisons between the ratios of the quantity of text samples that contain the identified terms and no other terms and the quantity of text samples that begin with the identified and contain additional terms and the threshold ratio, the computing device 110 identifies that the utterance is likely incomplete until after the term 130, "life." In response to the general endpointer signal 104 being inactive, the computing device 110 may have compared the ratio of the quantities to the threshold ratio with the terms 120 and 122 "what is" and determined that "what is" represents a likely incomplete utterance. In response to the general endpointer signal 104 being inactive, the computing device 110 may have compared the ratio of the quantities to the threshold ratio with the terms 120-130 "what is the meaning of life" and determined that "what is the meaning of life" does not represent a likely incomplete utterance. The computing device 110 may have determined that terms 120-130 correspond to the beginning of one hundred text samples and determined that the terms 120-130 correspond to one thousand full samples. The ratio would be 1000:100, which is greater than the threshold ratio of 1:200. Therefore, the computing device 110 classifies the terms 120-130 as not likely an incomplete utterance. As shown in FIG. 1A, the utterance 112 is likely incomplete until after the term 130, "life."

The computing device 112 concludes that the utterance 112 is complete as illustrated in the end of utterance signal 108. Once the computing device 112 concludes that the utterance 112 is complete, the computing device 110 outputs the utterance 112 as transcription 135. For example, the computing device 110 may output "what is the meaning of life" as the transcription 135 of utterance 112.

In some implementations, the computing device 110 overrides a general endpointing determination based on classifying an utterance is likely incomplete. For example, the computing device 110 classifies "what is" as likely an incomplete utterance. The computing device 110 overrides the general endpointing determination before determining that the end of the utterance is reached.

FIG. 1B is a diagram 150 of an utterance and example signals used in classifying whether the utterances are likely incomplete. Diagram 150 illustrates the computing device 160 processing the audio input 152 that corresponds to the utterance 162 "who is Barack Obama" spoken by user 164. Similar to computing device 110 in FIG. 1A, computing device 160 receives a general endpointer signal 154 for the audio input 152. The computing device 160 receives the general endpointer signal 154 from a general endpointer, where the general endpointer identifies endpoints based on the time between terms 120-126. For example, the computing device 160 determines that the time between term 170, "who," and term 172, "is," is fifty milliseconds and determines that the time between term 172, "is," and term 174, "Barack," is two hundred milliseconds. If the threshold used by general endpointer for general endpointing is one hundred fifty milliseconds, then the general endpointer identifies endpoints between term 172, "is," and term 174, "Barack," and no endpoints between term 170, "who," and term 172, "is." The general endpointer signal 154 illustrates these endpoints before terms 170 and 174 and after terms 172 and 176.

The computing device 160 generates a likely incomplete utterance signal 156 as the ASR software identifies terms of the utterance 162 and the general endpointer identifies endpoints. Similar to computing device 110 in FIG. 1A, the computing device 160 determines the quantity of text samples in a collection of text samples that match the identified terms and the quantity of text samples in the collection of text samples that begin with the identified terms and contain additional terms. For example, the computing device 160 determines that terms 170 and 172, "who is," match fifty of the text samples in the collection of text samples. To illustrate, the collection of text samples may contain fifty samples of term 128, "whois." The computing device 160 determines that terms 170 and 172, "who is," match the beginning of three thousand text samples in the collection of text samples. To illustrate, the collection of text samples that may contain samples such as "who is the pope," "who is my congressman," and "who is Barack Obama."

The computing device 160 computes a ratio of the quantity of text samples in a collection of text samples that match the identified terms to the quantity of text samples in the collection of text samples that begin with the identified terms. The computing device compares this to a threshold ratio to determine if the identified terms represent a likely incomplete query. In this example, the ratio is 50:3000. As described above, the threshold ratio may be 1:200. As the ratio of 50:3000 is greater than the threshold ration of 1:200, the computing device 160 determines that the terms 170 and 172 are not a likely incomplete utterance as illustrated by term 178, "whois" and a drop in the likely incomplete utterance signal 156 at the end of the audio input 152 at term 178.

The computing device 160 determines that the end of the utterance has been reached once the computing device 160 no longer classifies the identified terms as likely an incomplete utterance. The end of utterance signal 158 indicates that the computing device 160 has identified an end of utterance at the audio input 152 at term 178. The computing device 160 outputs the term 178 as utterance 185.

In some implementations, the computing device 160 deactivates a microphone of the computing device 160 based on classifying that the identified terms are not likely incomplete. For example, the computing device 160 may deactivate a microphone used to receive the audio input 152 once the computing device 160 determines the term 178, "whois" is not a likely incomplete utterance. In some implementations, the computing device 160 may add an endpoint to the identified terms once the computing device identifies the terms as not likely incomplete. For example, the computing device may endpoint the utterance after the term 178 "whois."

In some implementations, the computing device may deactivate the microphone based on the ratio of the quantity of text samples in a collection of text samples that match the identified terms to the quantity of text samples in the collection of text samples that begin with the identified terms. The computing device may deactivate the microphone if the ratio does not satisfy a particular range, leave the microphone activated for a particular period of time if the ratio satisfies the particular range, or leave the microphone activated until the computing device determines again that the utterance is likely incomplete if the ratio does not satisfy the particular range. For example, the particular range of ratios may be 1:200 to 1:30. If the determined ratio is 5:2000, which is less than 1:200, then the computing device determines to leave the microphone activated. If the determined ratio is 5:300, which is between 1:200 and 1:30, then the computing device leaving the microphone activated for a particular time period such as two seconds. If the computing device receives additional audio input before two seconds, then the computing device processes the additional audio input. If the computing device does not receive additional audio input within the two seconds, then the computing device deactivates the microphone. If the determined ratio is 1:20, then the computing device deactivates the microphone.

In FIG. 1B, the computing device 160 determines at a second point that the utterance is not likely incomplete. The computing device 160 determines that the terms 174 and 176, "Barack Obama," correspond to not a likely incomplete utterance, and therefore the computing device 160 determines the end of the utterance after the term 176, "Obama," as illustrated with the end of utterance signal 158. The computing device 160 outputs two transcriptions of transcription 185, "whois," and transcription 188, "Barack Obama."

FIG. 1C is diagram 200 of an utterance and example signals used in classifying the utterance as likely incomplete or not likely incomplete. In general diagram 200 illustrates signals 202-208 that are generated or detected by computing device 210 when the computing device is processing an incoming audio signal in the presence of background noise. The computing device 210 receives an audio input 202 and background noise through a microphone or other audio input device of the computing device 210 and classifies the audio input 202 as an utterance that is likely incomplete or not likely incomplete. In the example illustrated in diagram 200, the background noise is music 218.

The example illustrated in FIG. 1C is similar to the example illustrated is FIG. 1A except for the additional music 218 that the computing device 210 receives. In FIG. 1C, the use 214 speaks the utterance 212, "what is . . . the meaning of life." The computing device 212 receives the audio input 202 and music 218 and generates the general endpointing signal 204. The initial endpoint for the audio input 202 corresponds to the term 220, "what." With the music 218 in the background, the computing device 212 is unable to identify an additional endpoint for the audio input 202 because the signal strength of the audio input 202 does not fall below a threshold. As is illustrated by the general endpointing signal 204 remains active even after the user 214 finishes speaking the utterance 212.

Despite the computing device 210 or a general endpointer being executed on the computing device 210 being unable to generate the general endpointing signal 204 in the presence of the music 218, the computing device 210 identifies the terms 220-230 of the utterance 212. As above, the computing device 210 compares the identified terms to a collection of text samples. The computing device 210 calculates the quantity of text samples in the collection of text samples that begin with the identified terms of the utterance 212 and the quantity of text samples that contain the identified terms of the utterance 212. The computing device 210 determines that the ratio is 5:2000 with the terms 220-222, "what is," and that the ratio is 1000:100 with the terms 220-230, "what is the meaning of life." The computing device 210 compares the terms to the threshold of 1:200 and determines that the terms 220-230, "what is the meaning of life," do not correspond to a likely incomplete utterance as illustrated by the likely incomplete utterance signal 206. The computing device 210 concludes that the utterance 212 has reached the end of the utterance based on the terms 220-230, "what is the meaning of life," not corresponding to a likely incomplete utterance. The computing device 210 then outputs the transcription 235, "what is the meaning of life."

Figure 2:
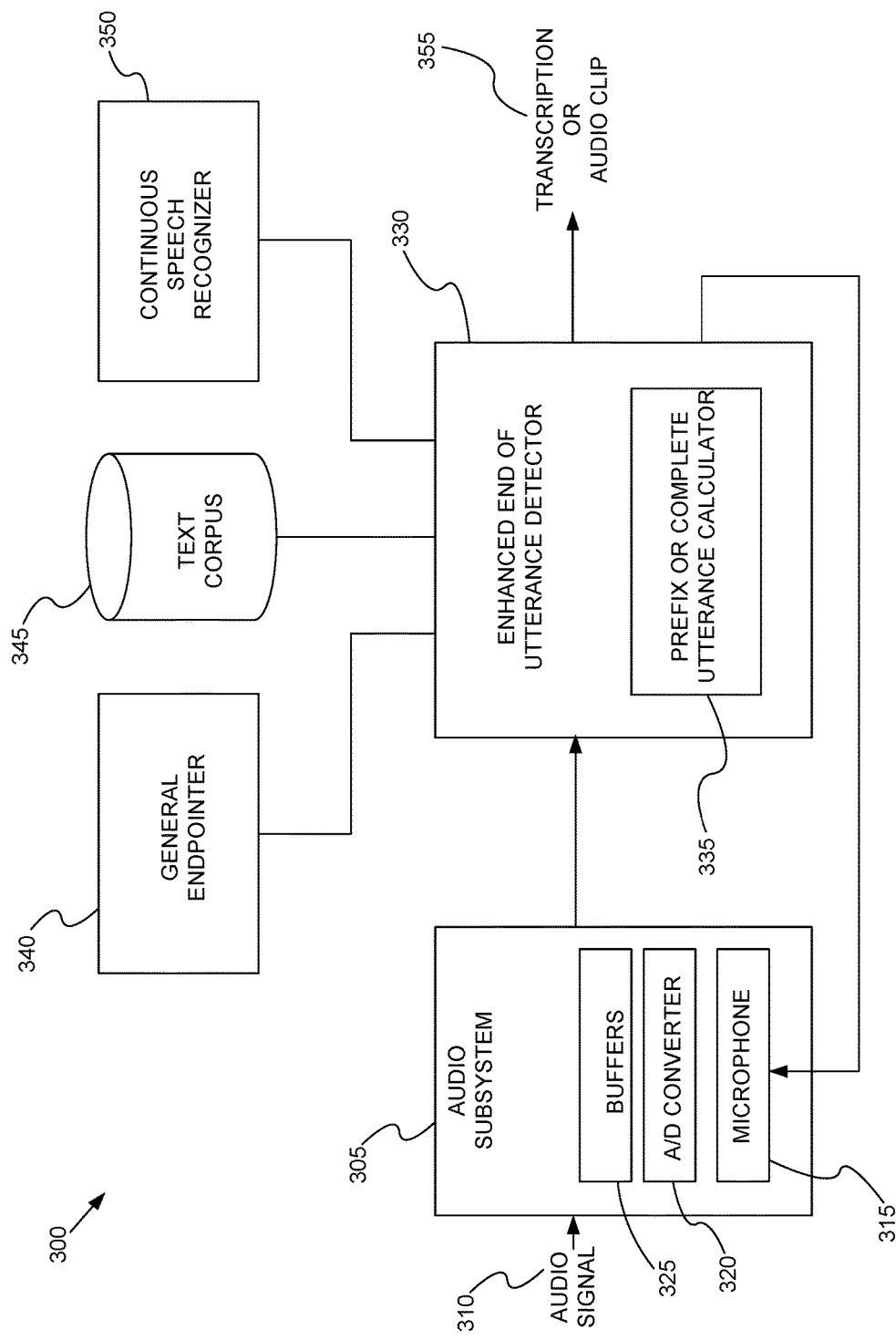
FIG. 2 is a diagram of an example system that classifies an utterance as likely complete or likely incomplete.

FIG. 2 is a diagram of an example system 300 that classifies an utterance as likely complete or likely incomplete. The components of the system 300 may be contained in a computing device such as computing device 110, 160, or 210. The system 300 includes an audio subsystem 305. The audio subsystem 305 may receive an audio signal 310 from an outside source such as human speech. The audio subsystem 305 include a microphone 315 to receive the audio signal 310. The audio subsystem 305 converts the audio received through the microphone 315 to a digital signal using the analog-to-digital converter 320. The audio subsystem 305 also includes buffers 325. The buffers 325 may store the digitized audio, for example, in preparation for further processing by the system 300.

The enhanced end of utterance detector 330 receives and processes the digitized audio from the audio subsystem 305. The enhanced end of utterance detector 330 classifies the digitized audio as likely an incomplete utterance or not likely an incomplete utterance by identifying terms of the digitized audio using the continuous speech recognizer 350 and comparing the identified terms to a text corpus 345. Additionally, the enhanced end of utterance detector 330 identifies general endpoints for the digitized audio using the general endpointer 340.

As the enhanced end of utterance detector 330 receives digitized audio, the enhanced end of utterance detector 330 uses the continuous speech recognizer 350 to identify terms that correspond to the digitized audio. The continuous speech recognizer 350 uses automated speech recognition to identify the terms that correspond to the digitized audio. In some implementations, the continuous speech recognizer 350 may be implemented locally on the device that receives the audio signal 310. In some implementations, the continuous speech recognizer 350 is implemented on a server and the device that receives the audio signal 310 transmits the digitized audio to the server over a network. The server then sends back terms of the digitized audio as the server identifies them. The enhanced end of utterance detector 330 records the time between receiving terms from the continuous speech recognizer 350. For example, the continuous speech recognizer 350 identifies a term "what," transmits the term to the continuous speech recognizer 350, and one hundred milliseconds later identifies a term "is" and transmits the term to the continuous speech recognizer 350.

As the enhanced end of utterance detector 330 receives digitized audio, the enhanced end of utterance detector 330 uses data from the general endpointer 340 to identify general endpoints that correspond to the digitized audio. In some implementations, the general endpointer 340 analyzes the energy level of the digitized audio to determine endpoints. The general endpointer 340 may endpoint the digitized audio if the energy level drops below a threshold for at least a particular amount of time. For example, if the digitized audio corresponds to the user speaking "what is" and then silence for three hundred milliseconds, then the general endpointer 340 determines that the silence is below an energy threshold and the period of the silence, three hundred milliseconds, is at least longer than a threshold time of two hundred milliseconds. In this instance, the general endpointer 340 determines that there is an endpoint at the end of the digitized audio corresponding to "is."

In some implementations, the general endpointer 340 receives terms identified by the continuous speech recognizer 350 and times between each of the terms. If the time between two terms satisfies a threshold, then the general endpointer 340 adds an endpoint between those two terms. For example, if between "what" and "is" is a period of one hundred milliseconds and the threshold is one hundred fifty milliseconds, then the general endpointer may not add an endpoint between "what" and "is" because the time period is below the threshold. As another example, if between "is" and "the" is a period of two hundred milliseconds and the threshold is one hundred fifty milliseconds, then the general endpointer may add an endpoint between "is" and "the" because the time period is above the threshold.

The general endpointer 340 may also identify a general endpoint when the energy level of the digitized audio increases above a threshold. For example, if the digitized audio corresponds to silence being followed by a user speaking "the," then the general endpointer 340 may determine that the energy of the digitized audio that corresponded to "the" is above a threshold. In this instance, the general endpointer 340 determines that there is an endpoint in the digitized audio that corresponds to the beginning of "the."

The enhanced end of utterance detector 330 classifies the utterance that corresponds to the audio signal 310 as likely an incomplete utterance or not likely an incomplete utterance using the prefix or complete utterance calculator 335. In some implementations, as the enhanced end of utterance detector 330 receives identified terms from the continuous speech recognizer 350, the enhanced end of utterance detector 330 compares those identified terms to the text corpus 345. The text corpus 345 may include search queries performed by multiple users or search queries performed by a particular user. In some implementations, the enhanced end of utterance detector 330 determines the number of text samples in the text corpus 345 that match the identified terms and the number of text samples in the text corpus 345 that begin with the identified terms and do not contain additional terms. For example, if the identified term is "what," then the enhanced end of utterance detector 330 determines that "what" matches three of the text samples in the text corpus 345 and "what" is the prefix of three thousand text samples in the text corpus 345. If the identified terms are "what is," then the enhanced end of utterance detector 330 determines that "what is" matches three of the text samples in the text corpus 345 and "what is" is the prefix of two thousand text samples in the text corpus 345.

In some implementations, the enhanced end of utterance detector 330 determines the number of text samples in the text corpus 345 that match the identified terms when the identified terms are followed by a pause that satisfies a threshold. For example, the threshold may be one hundred fifty milliseconds. If the identified term is "what" and is followed by fifty milliseconds, then the enhanced end of utterance detector 330 may not determines the number of text samples in the text corpus 345 that match the "what"

and the number of text samples in the text corpus 345 that begin with "what." As another example, if the identified terms are "what is" and is followed by two hundred milliseconds, then the enhanced end of utterance detector 330 determines that "what is" matches three of the text samples in the text corpus 345 and "what is" is the prefix of two thousand text samples in the text corpus 345. In some implementations, the enhanced end of utterance detector 330 uses the general endpointing signal from the general endpointer 340 instead of identifying terms that are followed by a pause that satisfies a threshold.

The prefix or complete utterance calculator 335 uses the determined quantity of text samples to classify the identified terms as likely an incomplete utterance or not likely an incomplete utterance. The prefix or complete utterance calculator 335 computes a ratio using the number of text samples in the text corpus 345 that match the identified terms and the number of text samples in the text corpus 345 that begin with the identified terms. The prefix or complete utterance calculator 335 compares the determined ratio to a threshold ratio. If the computed ratio satisfies the threshold ratio, then the identified terms are not likely an incomplete utterance. If the computed ratio does not satisfy the threshold ratio, then the identified terms are likely an incomplete utterance. For example, if the threshold ratio is 1:200 and the identified terms are "what is," then the determined ratio would be 3:2000. In this instance, the computed ratio is less than the threshold ratio, so the prefix or complete utterance calculator 335 would classify the identified terms as likely an incomplete utterance. As another example, if the threshold ratio is 1:200 and the identified terms are "who is," then the computed ratio would be 1:150. In this instance, the computed ratio is greater than the threshold ratio, so the prefix or complete utterance calculator 335 would classify the identified terms as not likely an incomplete utterance.

In some implementations, once the prefix or complete utterance calculator 335 classifies an utterance as not likely incomplete, the enhanced end of utterance detector 330 deactivates the microphone 315 so that the audio subsystem 305 does not receive an additional audio signal. In some implementations, once the prefix or complete utterance calculator 335 classifies the a utterance is likely incomplete, the enhanced end of utterance detector 330 maintains the microphone 315 in an active state so that the audio subsystem 305 receives an additional audio signal.

The enhanced end of utterance detector 330 outputs the identified terms as a transcription or audio clip 355 once the enhanced end of utterance detector 330 classifies the utterance as not likely incomplete. In some implementations, the transcription or audio clip 355 is a transcription of the identified terms that the enhanced end of utterance detector 330 classifies as not likely incomplete. For example, the transcription or audio clip 355 may be the terms "what is the meaning of life." In some implementations, the transcription or audio clip 355 is an audio clip of the identified terms that the enhanced end of utterance detector 330 classifies as not likely incomplete. For example, the transcription or audio clip 355 may be an audio clip that corresponds to the term "whois." The audio clip may be shorted to only include the portion of the audio signal 310 that contains the identified terms. The audio clip may be accompanied with a transcription or additional metadata.

Figure 3:
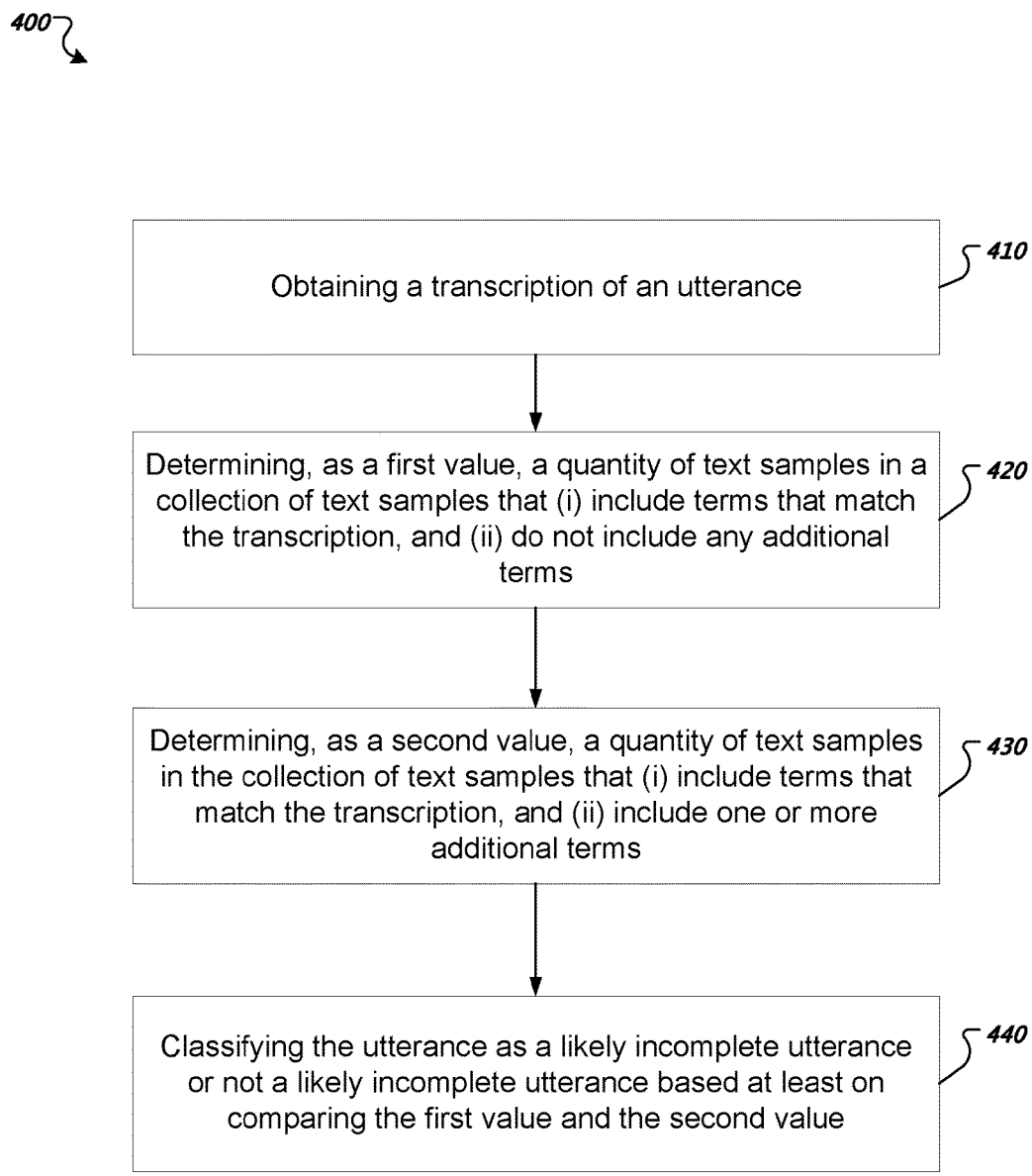
FIG. 3 is a diagram of an example process for classifying whether an utterance is likely incomplete.

FIG. 3 is a diagram of an example process for classifying whether an utterance is likely incomplete. The process 400 may be performed by a computing device such as the computing device 110 from FIG. 1A. The process 400 analyzes audio data and classifies an utterance as likely incomplete or not likely incomplete using word comparisons.

The computing device obtains a transcription of an utterance (410). The utterance may be received from a user speaking into a microphone of the device and the device receiving an audio signal corresponding to the user speaking. The device processes the audio signal to identify a transcription of the terms that the user is speaking. In some implementations, the device may record timing data that specifies the time between terms of the transcription.

The computing device determines, as a first value, a quantity of text samples in a collection of text samples that (i) include terms that match the transcription, and (ii) do not include any additional terms (420). The collection of text samples may be a collection of search queries that can be tied to a particular user or that are generated by multiple users. In some implementations, the device identifies the quantity of text samples that include the terms in the same order as the transcription. For example, the transcription is "what is." The device identifies five text samples in the collection of text samples that include the terms "what" and "is" and no other terms. The device identifies three of those text samples include "what" and "is" in the same order as "what is." In this example, the first value three.

The computing device determines, as a second value, a quantity of text samples in the collection of text samples that (i) include terms that match the transcription, and (ii) include one or more additional terms (430). In some implementations, the device identifies the quantity of text samples that include the terms of the transcription as a prefix of the text samples. For example, the transcription is "what is." The device identifies three thousand text samples in the collection of text samples that include the terms "what is" as a prefix. For example, "what is the weather" includes the prefix "what is." The device may also identify fifty text samples in the collection of text samples that include "what is" as an infix. For example, "most popular movie what is it" includes "what is" as an infix. The device may also identify two text samples in the collection of text samples that include "what is" as a postfix. For example, "scary monster what is" includes "what is" as a postfix. In this example, the second value is three thousand.

The computing device classifies the utterance as a likely incomplete utterance or not a likely incomplete utterance based at least on comparing the first value and the second value (440). In some implementations, the device computes a ratio of the first value to the second value and compares the computed ratio to a threshold radio. Based on the comparison of the computed ratio to the threshold ratio, the device may classify the utterance as likely incomplete. For example, if the computed ratio of the first value to the second value is 3:3000 and the threshold ratio is 1:200, then with the computed ratio less than the threshold ratio, the device classifies the utterance as likely incomplete. If the computed ratio of the first value to the second value is 1:150 and the threshold ratio is 1:200, then with the computed ratio greater than the threshold ratio, the device classifies the utterance as not likely incomplete.

In some implementations, the device classifies the utterance as likely incomplete and maintains the microphone of the device in an active state to receive an additional utterance. In some implementations, the device classifies the utterance as not likely incomplete and deactivates the microphone of the device and begins to process the utterance. In some implementations, the device may classify the utterance as complete based on the user pausing for a long time after speaking. For example, the device may conclude, by using a general endpointer, that "what is" followed by a long pause is a complete utterance. If the device compares "what is" to the collection of text samples and classifies "what is" as likely an incomplete utterance, the device may override the initial conclusion that the utterance is complete. The device may maintain the microphone in an active state to receive an additional utterance.

In some implementations, the device classifies the utterance as not likely incomplete and processes the utterance. The device may submit a transcript of the utterance to a search engine or other natural language processing engine. In some instances, the search engine or other natural language processing engine may determine an appropriate response to the utterance and output the response to device for playback to the user. The search engine or other natural language processing engine may determine a response that has the possibility to elicit a reply from a user. In that instance, the search engine or other natural language processing engine may include a flag in the response for the device to maintain the microphone in an active state so that the user may reply. For example, the device submits an utterance "what time is it" to a search engine and the search engine determines it is three o'clock. In this example, there is little likelihood that the user will have a follow on response to the time. Therefore, the search engine provides the data to the device so that the device tells the user that the time is "three o'clock" and the data includes a flag for the device not to maintain the microphone in an active state after telling the user the time. As another example, a device submits an utterance "when is the next baseball game" to a search engine and the search engine determines that an appropriate response is "The baseball game is on Sunday. Would you like to set a reminder?" In this example, there is a high likelihood that the user will have a follow on response to the question regarding setting the reminder. Therefore, the search engine provides the data to the device so that the device tells the user "The baseball game is on Sunday. Would you like to set a reminder?" and the data includes a flag for the device to maintain the microphone in an active state after telling the user the time so that the user may speak the answer without manually activating the microphone or using a hot word.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any innovations or of what may be claimed, but rather as descriptions of features specific to particular embodiments of particular innovations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, from a given user and by a microphone of a mobile device that includes (i) the microphone, (ii) an automated speech recognition system, and (iii) an end of utterance detector that is configured to identify an endpoint of an utterance spoken by a user in response to determining that a speaker has stopped speaking for a fixed duration, a first utterance;
   determining, by the end of utterance detector, that the given user has stopped speaking for the fixed duration after the first utterance;
   generating, by the automated speech recognition system, a first transcription of the first utterance;
   based on the first transcription of the first utterance, maintaining the microphone in an active state without endpointing the first utterance;
   after the given user has stopped speaking for at least the fixed duration after the first utterance, receiving, by the microphone and from the given user, a second utterance;
   generating, by the automated speech recognition system, a second transcription of the second utterance;
   based on both the first transcription and the second transcription, deactivating the microphone and endpointing the second utterance;
   in response to endpointing the second utterance, submitting, by the mobile device, a single search query that includes both the first transcription and the second transcription;

receiving, by the mobile device, search results in response to the single search query that includes both the first transcription and the second transcription; and providing, for output by the mobile device, the search results.

2. The method of claim 1, wherein the single search query that includes both the first transcription and the second transcription is submitted without submitting a search query that includes the first transcription without the second transcription.

3. The method of claim 1, wherein the single search query that includes both the first transcription and the second transcription is submitted without submitting a search query that includes only the first transcription.

4. The method of claim 1, comprising:
after the given user has stopped speaking for longer than the fixed duration after the end of the first utterance and before the given user speaks the second utterance, updating a user interface to include the first transcription.

5. The method of claim 1, comprising:
after receiving the second utterance, updating a user interface to include the first transcription and the second transcription, without updating the user interface after the given user has stopped speaking for longer than the fixed duration after the end of the first utterance to include only the first transcription.

6. The method of claim 5, wherein the user interface is updated after the second utterance to include both the first transcription and the second transcription in response to receiving the first utterance and the second utterance.

7. The method of claim 1, comprising:
determining that the first utterance is a likely incomplete utterance,
wherein maintaining the microphone in an active state without endpointing the first utterance comprises maintaining the microphone in an active state without endpointing the first utterance based on determining that the first utterance is a likely incomplete utterance.

8. The method of claim 1, comprising:
after providing, for output by the mobile device, the search results, reactivating the microphone;
receiving, by the microphone of the mobile device and from the given user, a third utterance;
determining, by the end of utterance detector, that the given user has stopped speaking for the fixed duration after the third utterance;
generating, by the automated speech recognition system, a third transcription of the third utterance;
based on the third transcription of the third utterance, endpointing the third utterance; and
in response to endpointing the third utterance, submitting a second search query that includes the third transcription.

9. The method of claim 8, comprising:
after the given user has stopped speaking for the fixed duration after the third utterance, updating the user interface to include the third transcription.

10. The method of claim 9, wherein the user interface is updated to include the third transcription in response to determining that the given user has stopped speaking for the fixed duration after the end of the third utterance.

11. The method of claim 8, comprising:
after the given user has stopped speaking for the fixed duration after the third utterance, receiving, by the microphone and from the given user, a fourth utterance;

generating, by the automated speech recognition system, a fourth transcription of the fourth utterance;
updating the user interface after the fourth utterance to include the fourth transcription.

12. The method of claim 11, comprising:
submitting a third search query that includes the transcription of the fourth utterance.

13. The method of claim 12, wherein the fourth utterance is followed by a pause of longer than the fixed duration, wherein the third search query is submitted after the pause.

14. The method of claim 11, wherein updating the user interface after the fourth utterance comprises removing the third transcription from the user interface.

15. The method of claim 8, wherein the third utterance is not a likely incomplete utterance.

16. The method of claim 1, wherein the second utterance is followed by a pause of longer than the fixed duration, wherein the search query is submitted after the pause.

17. The method of claim 1, wherein deactivating the microphone and endpointing the second utterance comprises deactivating the microphone and endpointing the second utterance before the fixed duration has elapsed after the given user has stopped speaking after the second utterance.

18. The method of claim 1, wherein generating, by the automated speech recognition system, a first transcription of the first utterance comprises generating, by the automated speech recognition system, a first transcription of the first utterance in response to determining that the given user has stopped speaking for the fixed duration after the first utterance.

19. The method of claim 1, wherein, based on the first transcription of the first utterance, maintaining the microphone in an active state without endpointing the first utterance comprises:
comparing the first transcription to a collection of text samples;
determining a first quantity of text samples in a collection of text samples that (i) include terms that match the first transcription, and (ii) do not include any additional terms;
determining a second quantity of text samples in the collection of text samples that (i) include terms that match the first transcription, and (ii) include one or more additional terms; and
based on the first quantity and the second quantity, maintaining the microphone in an active state without endpointing the first utterance.

20. A system comprising:
one or more computers and one or more storage devices storing instructions that are operable, when executed by the one or more computers, to cause the one or more computers to perform operations comprising:
receiving, from a given user and by a microphone of a mobile device that includes (i) the microphone, (ii) an automated speech recognition system, and (iii) an end of utterance detector that is configured to identify an endpoint of an utterance spoken by a user in response to determining that a speaker has stopped speaking for a fixed duration, a first utterance;
determining, by the end of utterance detector, that the given user has stopped speaking for the fixed duration after the first utterance;
generating, by the automated speech recognition system, a first transcription of the first utterance;

based on the first transcription of the first utterance, maintaining the microphone in an active state without endpointing the first utterance;

after the given user has stopped speaking for at least the fixed duration after the first utterance, receiving, by the microphone and from the given user, a second utterance;

generating, by the automated speech recognition system, a second transcription of the second utterance;

based on both the first transcription and the second transcription, deactivating the microphone and endpointing the second utterance;

in response to endpointing the second utterance, submitting, by the mobile device, a single search query that includes both the first transcription and the second transcription;

receiving, by the mobile device, search results in response to the single search query that includes both the first transcription and the second transcription; and providing, for output by the mobile device, the search results.

21. The system of claim 20, wherein the single search query that includes both the first transcription and the second transcription is submitted without submitting a search query that includes the first transcription without the second transcription.

22. The system of claim 20, wherein the operations further comprise:

after receiving the second utterance, updating a user interface to include the first transcription and the second transcription, without updating the user interface after the given user has stopped speaking for longer than the fixed duration after the first utterance to include only the first transcription.

23. A non-transitory computer-readable medium storing software comprising instructions executable by one or more computers which, upon such execution, cause the one or more computers to perform operations comprising:

receiving, from a given user and by a microphone of a mobile device that includes (i) the microphone, (ii) an automated speech recognition system, and (iii) an end of utterance detector that is configured to identify an endpoint of an utterance spoken by a user in response to determining that a speaker has stopped speaking for a fixed duration, a first utterance;

determining, by the end of utterance detector, that the given user has stopped speaking for the fixed duration after the first utterance;

generating, by the automated speech recognition system, a first transcription of the first utterance;

based on the first transcription of the first utterance, maintaining the microphone in an active state without endpointing the first utterance;

after the given user has stopped speaking for at least the fixed duration after the first utterance, receiving, by the microphone and from the given user, a second utterance;

generating, by the automated speech recognition system, a second transcription of the second utterance;

based on both the first transcription and the second transcription, deactivating the microphone and endpointing the second utterance;

in response to endpointing the second utterance, submitting, by the mobile device, a single search query that includes both the first transcription and the second transcription;

receiving, by the mobile device, search results in response to the single search query that includes both the first transcription and the second transcription; and providing, for output by the mobile device, the search results.

* * * * *